(No Model.)
W. GRIESSER.
CONVEYER.
No. 388,194. Patented Aug. 21, 1888.
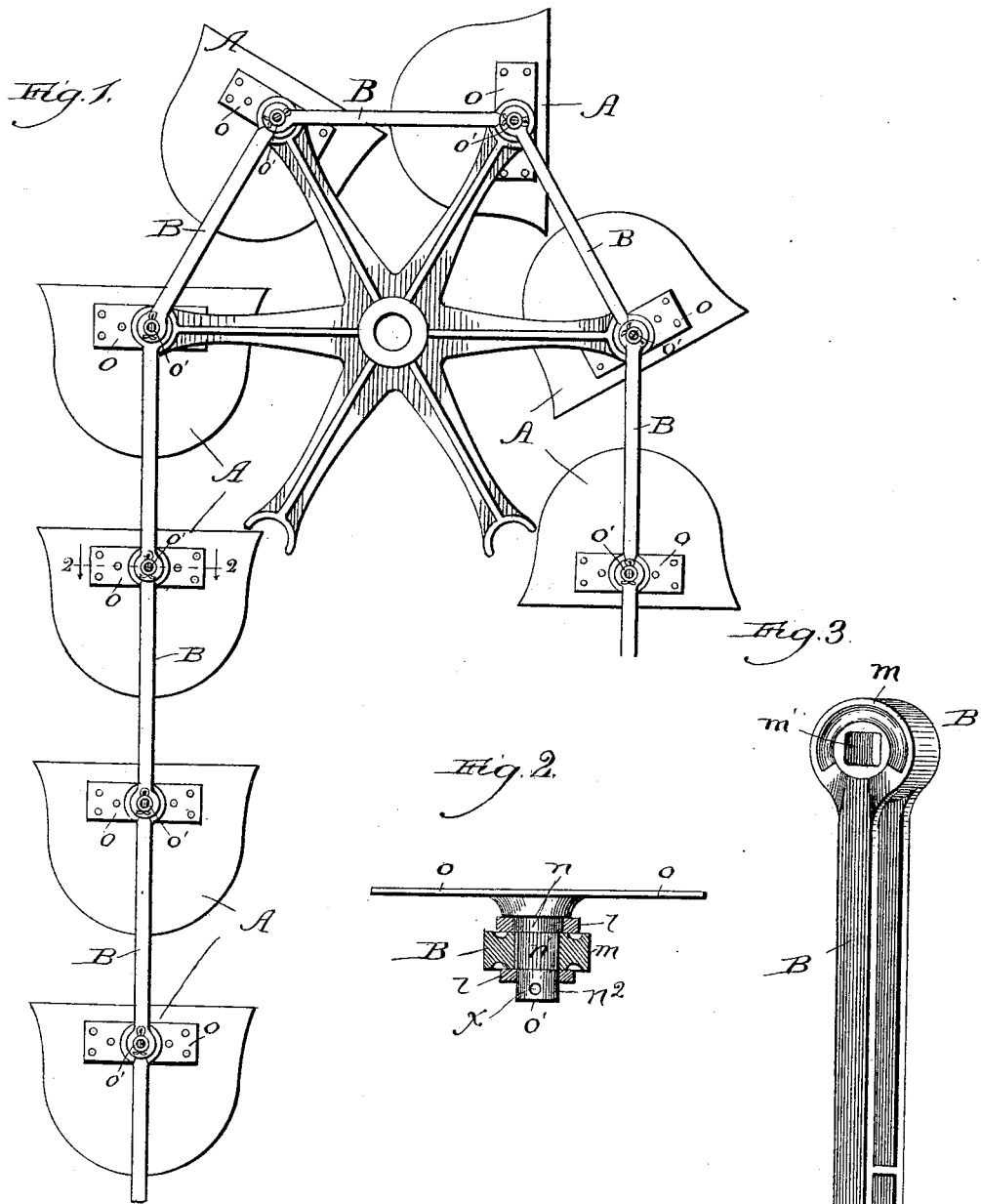
Witnesses:
Chas. E. Gaylord
J. N. Dyrenforth
Inventor:
William Griesser,
By Dyrenforth & Dyrenforth
Att'ys

UNITED STATES PATENT OFFICE.

WILLIAM GRIESSER, OF CHICAGO, ILLINOIS.

CONVEYER.

SPECIFICATION forming part of Letters Patent No. 388,194, dated August 21, 1888.

Application filed October 14, 1887. Serial No. 252,351. (No model.)

*To all whom it may concern:*

Be it known that I, WILLIAM GRIESSER, a subject of the Emperor of Germany, residing at Chicago, in the county of Cook and State of Illinois, have invented a new and useful Improvement in Conveyers, of which the following is a specification.

My invention relates to an improvement upon a conveyer for which Letters Patent of the United States No. 331,961 were granted to me December 8, 1885, to adapt it to a more convenient form for elevating. In my said Letters Patent the receptacles, linked together in endless series, are pivotally hung in the links, whereby they are adapted to maintain a normally upright position in whatever direction they are driven, the automatic dumping of the receptacles being effected by means of pinions upon the receptacles arranged to engage with racks provided in the paths of the pinions.

My present object is to provide a conveyer comprising two endless chains carrying a receptacle between them, or a number of receptacles in endless series and adapted to scoop up the material to be conveyed and discharge it automatically.

To this end my invention consists in a conveyer having endless chains and scoops having arbors provided with non-pivotal bearings for links of the endless chains extending from the scoops in one direction, and pivotal bearings for the ends of the adjacent links extending from the scoops in the opposite direction; and it further consists in certain details of construction and combinations of parts; all as hereinafter more fully set forth.

In the drawings, Figure 1 is a side elevation of the upper portion of a conveyer involving my improved construction; Fig. 2, a broken section on the line 2 2 of Fig. 1, showing the preferred construction for connecting the scoop rigidly to a link extending in one direction and flexibly to a link extending in the opposite direction; Fig. 3, a perspective view of my improved form of link.

A denotes the receptacles or scoops, connected together by the links B of an endless chain. As in my aforesaid Letters Patent, the receptacles are supported between two parallel endless chains attached to opposite sides of the receptacles, the whole being supported and propelled on sprocket-wheels located at desired points along the conveyer, and more especially where the course of the conveyer is changed, the spokes of the sprocket-wheels being provided with sockets at their outer extremities. The link involves, as essential and broadly-described features, a solid head at one end and a bifurcated head at the opposite end, one head having an angular transverse opening at which a scoop is rigidly secured, and the other a circular transverse opening at which a scoop is pivotally secured.

The detailed description of my device is as follows: Fastening-plates $o$ are rigidly secured to opposite sides of each scoop, and from the outer side of each plate an arbor, $o'$, extends, provided with a circular bearing, $n$, an angular bearing, $n'$, smaller in cross-section than the bearing $n$, and a circular bearing, $n^2$, smaller in cross-section than the bearing $n'$. If desired, the arbors $o'$ may extend directly from the sides of the scoops, when the plates $o$ may be dispensed with. The links B comprise each a solid head, $m$, at one end of the link, having an angular transverse opening, $m'$, to coincide with and fit snugly over the angular bearing $n'$, and a bifurcated head, $l$, at the opposite end of the link to embrace the solid head $m$ of a similar link, and provided with circular transverse openings $l'$ and $l^2$ to fit the bearings $n$ and $n^2$, respectively. It will thus be seen that the arbor $o'$ on each plate $o$ affords a rigid bearing for the solid head of a link, and a flexible bearing on each side of the rigid bearing for the bifurcated head of an adjacent link, a key inserted through the keyhole $x$ serving to retain the links upon the arbor, though other means may be provided for this purpose.

The scoops A, linked together in endless series, are adjusted and held by means of the rigid connections afforded by the heads $m$, with their open sides toward the direction in which they are to travel; and, while I prefer to employ two chains composed of links B, one such chain on one side of the scoops, with a chain having only pivotal connections on the other side of the scoops, would serve to retain the scoops rigidly in their operative positions. When two chains of links B are employed, it is necessary, of course, that the links of both chains be adjusted with their solid heads $m$ pointing in the same direction with reference to the path they are to travel.

The operation of my improved conveyer is similar to that of the belt and scoop conveyer in common use, whereby material is scooped up from below and discharged automatically at the upper extremity of the conveyer by the change in direction of the latter from an upward to a downward course, the high rate of speed at which it is caused to travel serving to discharge the grain in a tangential direction.

While I show and describe an angular opening, $m'$, through the solid heads $m$ of the links B, it is obvious that any other form of opening and corresponding bearing, $n'$, which would serve to afford a rigid connection of a link, B, to the plate $o$, would answer; and as I do not confine my improved construction to a conveyer for any particular material, the receptacle A may be of any desired shape best adapted to its purpose; and one or any number of receptacles may be employed, and the number of links B in the endless chain may correspond with the number of receptacles employed, the remaining links being of any suitable construction.

What I claim as new, and desire to secure by Letters Patent, is—

1. In a conveyer, endless chains and scoops having arbors provided with non-pivotal bearings for links of the endless chains extending from the scoops in one direction, and pivotal bearings for the ends of the adjacent links extending from the scoops in the opposite direction, whereby each scoop is caused to maintain a fixed position with relation to the direction in which it travels, substantially as described.

2. In a conveyor, endless chains carrying scoops having arbors, each provided with two pivotal bearings and a non-pivotal bearing, and links, each provided at one end with circular openings to fit upon the pivotal bearings of the arbor of one scoop, and at the opposite end with a non-circular opening to fit upon the non-pivotal bearing of the arbor of an adjacent scoop, substantially as and for the purpose set forth.

3. A conveyer comprising, in combination, scoops A, linked together in endless series, plates upon the scoops having arbors $o'$, provided with circular bearings $n$ and $n^2$, and angular bearings $n'$ and links B, having bifurcated heads $l$, provided with circular transverse openings $l'$ and $l^2$, fitting the bearings $n$ and $n^2$, respectively, and solid heads $m$, provided with angular transverse openings $m'$, fitting the bearings $n'$, the whole being constructed and arranged to operate substantially as and for the purpose set forth.

WILLIAM GRIESSER.

In presence of—
J. W. DYRENFORTH,
CHAS. E. GAYLORD.